(12) United States Patent
Lou

(10) Patent No.: US 12,111,505 B2
(45) Date of Patent: Oct. 8, 2024

(54) LIGHT GUIDING DEVICE AND LIGHT GUIDING DEVICE APPLIED TO SILICON PHOTONICS STRUCTURE

(71) Applicant: STAR TECHNOLOGIES (WUHAN) CO., LTD., Hubei (CN)

(72) Inventor: Choon Leong Lou, Singapore (SG)

(73) Assignee: STAR TECHNOLOGIES (WUHAN) CO., LTD., Wuhan (CN)

( * ) Notice: Subject to any disclaimer, the term of this patent is extended or adjusted under 35 U.S.C. 154(b) by 232 days.

(21) Appl. No.: 17/728,908

(22) Filed: Apr. 25, 2022

(65) Prior Publication Data
US 2023/0185036 A1   Jun. 15, 2023

(30) Foreign Application Priority Data
Dec. 14, 2021   (CN) .......................... 202111527973.7

(51) Int. Cl.
G02B 6/42   (2006.01)
H04B 10/43   (2013.01)
H04B 10/80   (2013.01)

(52) U.S. Cl.
CPC ............ *G02B 6/4246* (2013.01); *H04B 10/43* (2013.01); *H04B 10/801* (2013.01)

(58) Field of Classification Search
None
See application file for complete search history.

(56) References Cited

U.S. PATENT DOCUMENTS

| | | | |
|---|---|---|---|
| 6,987,906 B2* | 1/2006 | Nakama | G02B 6/42 385/15 |
| 2007/0280585 A1* | 12/2007 | Warashina | G02B 6/43 385/14 |
| 2016/0356970 A1* | 12/2016 | De Jong | G02B 6/4214 |

* cited by examiner

*Primary Examiner* — Chad H Smith
(74) *Attorney, Agent, or Firm* — Li & Cai Intellectual Property Office

(57) ABSTRACT

A light guiding device for applying to silicon photonics structure is provided. The light guiding device includes an optical transceiver and a reflective structure. The reflective structure is disposed on the optical transceiver. The reflective structure has a reflective surface facing the optical transceiver, and the reflective surface is used for reflecting at least one light transmitted between the optical transceiver and a waveguide structure of the silicon photonics structure.

5 Claims, 3 Drawing Sheets

LIGHT GUIDING DEVICE AND LIGHT GUIDING DEVICE APPLIED TO SILICON PHOTONICS STRUCTURE

CROSS-REFERENCE TO RELATED PATENT APPLICATION

This application claims the benefit of priority to China Patent Application No. 202111527973.7, filed on Dec. 14, 2021 in People's Republic of China. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a light guiding device, and more particularly to a light guiding device for applying to a silicon photonics structure.

BACKGROUND OF THE DISCLOSURE

Currently, because of the increasing demand for data processing, the requirements for data transmission speed on electronic devices are also increasing. In order to improve an efficiency of signal transmission, silicon photonics, which has the advantages of low cost and low loss, has become one of the solutions.

In conventional technology, a fabrication of silicon photonics components is to form a waveguide structure on a silicon wafer for transmitting optical signals, and the methods of transmitting light signals are generally divided into front-light guide and side-light guide. The advantage of the method of the front-side light guide is that it is easily corresponded in position to the waveguide structure in the silicon wafer, but the signal loss caused by refraction is greater. Although the signal loss caused by the side-light guide is not as large as that of the front-light guide, the side-light guide is not easy to correspond in position. When conducting the side-light guide, it is usually necessary to dig a slot on the silicon wafer, it is usually necessary to dig a slot on the silicon wafer, and then insert the optical transceiver into the slot to correspond to the position of the waveguide structure in the silicon wafer. Further, when the slot is larger and deeper, the optical transceiver can be corresponded in position to the waveguide structure, easily. However, relatively speaking, an area of the slot occupied by the silicon wafer also increases, which in turn compresses the use area of the silicon wafer for other processes.

As shown in FIG. 1, in conventional technology, a light guide element with a mirror structure G can also be disposed in the slot. The mirror structure G can reflect the light L derived from the waveguide structure to a position above the optical transceiver. However, the method needs to form an independent reflective structure in the slot, so the required process steps are relatively complicated and require a large size of the slot.

Therefore, how to overcome the above-mentioned defects by making appropriate improvements has become one of the important issues to be solved by this project.

SUMMARY OF THE DISCLOSURE

In response to the above-referenced technical inadequacy, the present disclosure provides a light guiding device that overcomes the problem of "the size of the slot of the conventional silicon photonics structures being too large to reduce a usable area of the silicon wafer required for other processes", and "the steps for forming the mirror structure in the conventional silicon photonics structures being complicated, and the process cost being increased".

In one aspect, the present disclosure provides a light guide device for applying to a silicon photonics structure. The light guide device includes an optical transceiver and a reflective structure. The reflective structure is disposed on the optical transceiver. The reflective structure has a reflective surface facing the optical transceiver, and the reflective surface is configured to reflect at least one light transmitted between the optical transceiver and a waveguide structure of the silicon photonics structure.

In certain embodiments, the light guide device further includes a positioning platform. The optical transceiver is connected to the positioning platform, and the optical transceiver is configured to move in three dimensions through the positioning platform.

In certain embodiments, the silicon photonics structure further includes a silicon substrate. The waveguide structure is disposed in the silicon substrate, and a slot is formed on an upper surface of the silicon substrate. The reflective structure is configured to extend into the slot, so that the reflective surface faces the waveguide structure.

In certain embodiments, when the reflective structure is configured to extend into the slot, a distance between a bottom surface of the reflective structure and a bottom of the slot is smaller than a distance between the waveguide structure and the bottom of the slot.

In certain embodiments, the reflective surface is a curved surface in a concave shape.

In certain embodiments, the curved surface is a spherical surface.

In another aspect, the present disclosure provides a light guide device for applying to a silicon photonics structure. The light guide device includes an optical transceiver, a reflective structure, and a positioning platform. The reflective structure has a reflective surface facing the optical transceiver. The reflective surface is configured to reflect at least one light transmitted between the optical transceiver and a waveguide structure of the silicon photonics structure. The positioning platform is configured to connect to the optical transceiver and the reflective structure. The optical transceiver and the reflective structure are configured to move in three dimensions and adjust a relative position of each other through the positioning platform.

In certain embodiments, the silicon photonics structure further includes a silicon substrate; wherein the waveguide structure is disposed in the silicon substrate, and a slot is formed on an upper surface of the silicon substrate; wherein the reflective structure is configured to extend into the slot, so that the reflective surface faces the waveguide structure.

In certain embodiments, when the reflective structure is configured to extend into the slot, a distance between a bottom surface of the reflective structure and a bottom of the slot is smaller than a distance between the waveguide structure and the bottom of the slot.

In certain embodiments, the reflective surface is a curved surface in a concave shape.

In certain embodiments, the curved surface is a spherical surface.

Therefore, by virtue of "the reflective structure being disposed on the optical transceiver, or the optical transceiver and the reflective structure being connected through the positioning platform, so that the reflective surface of the reflective structure can reflect at least one light transmitted between the optical transceiver and the waveguide structure of the silicon photonics structure" the light guide device provided by the present disclosure improves the misalignment of the side light guide in the conventional technology, and eliminates the complicated process that requires additional coating, deposition and chemical etching in the slot to form an independent light guide element, so as to achieve the effect of cost saving and optimization of light guide efficiency.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
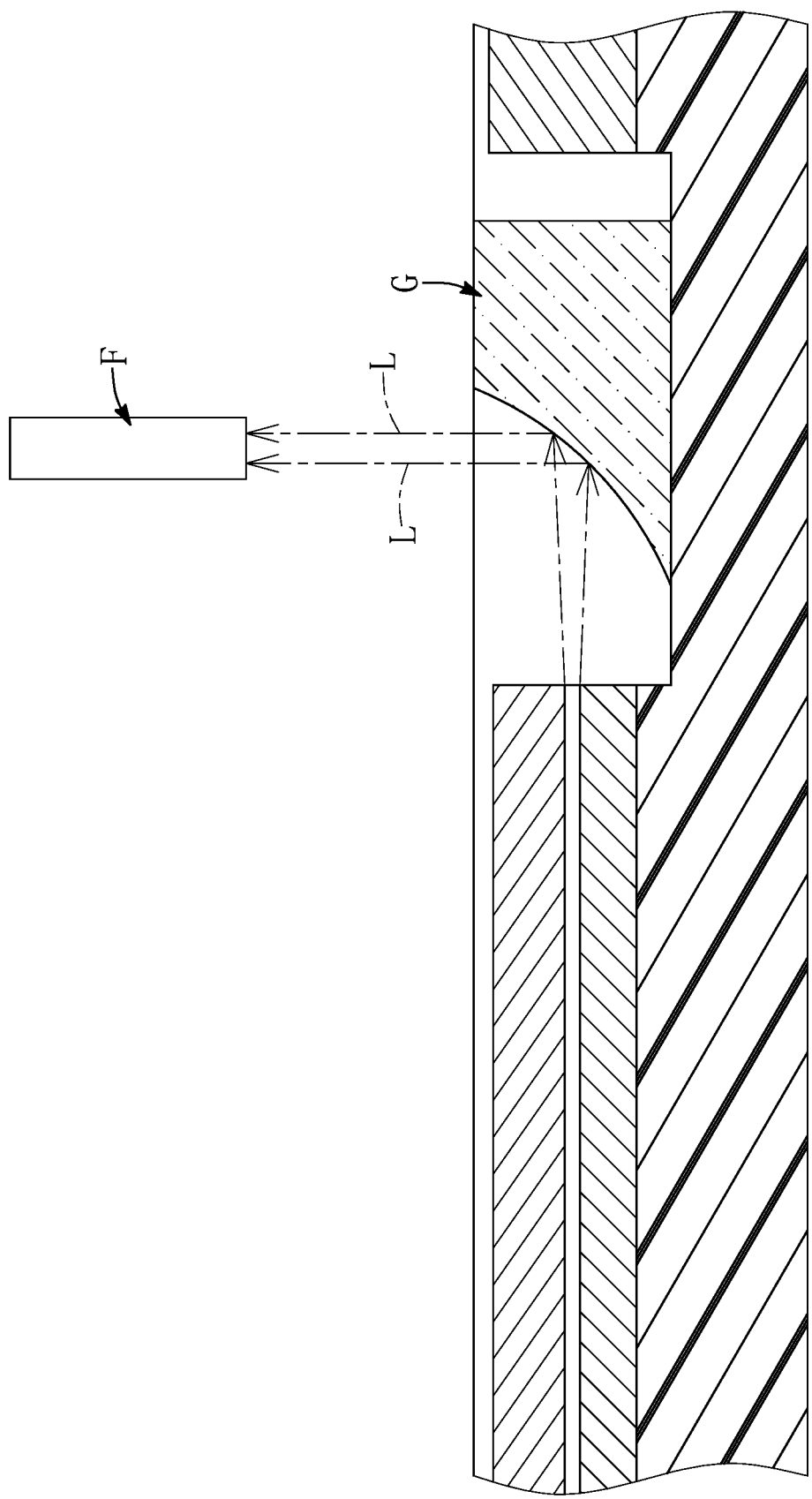
FIG. 1 is a cross-sectional view of a light guide structure of conventional technology.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

First Embodiment

Figure 2:
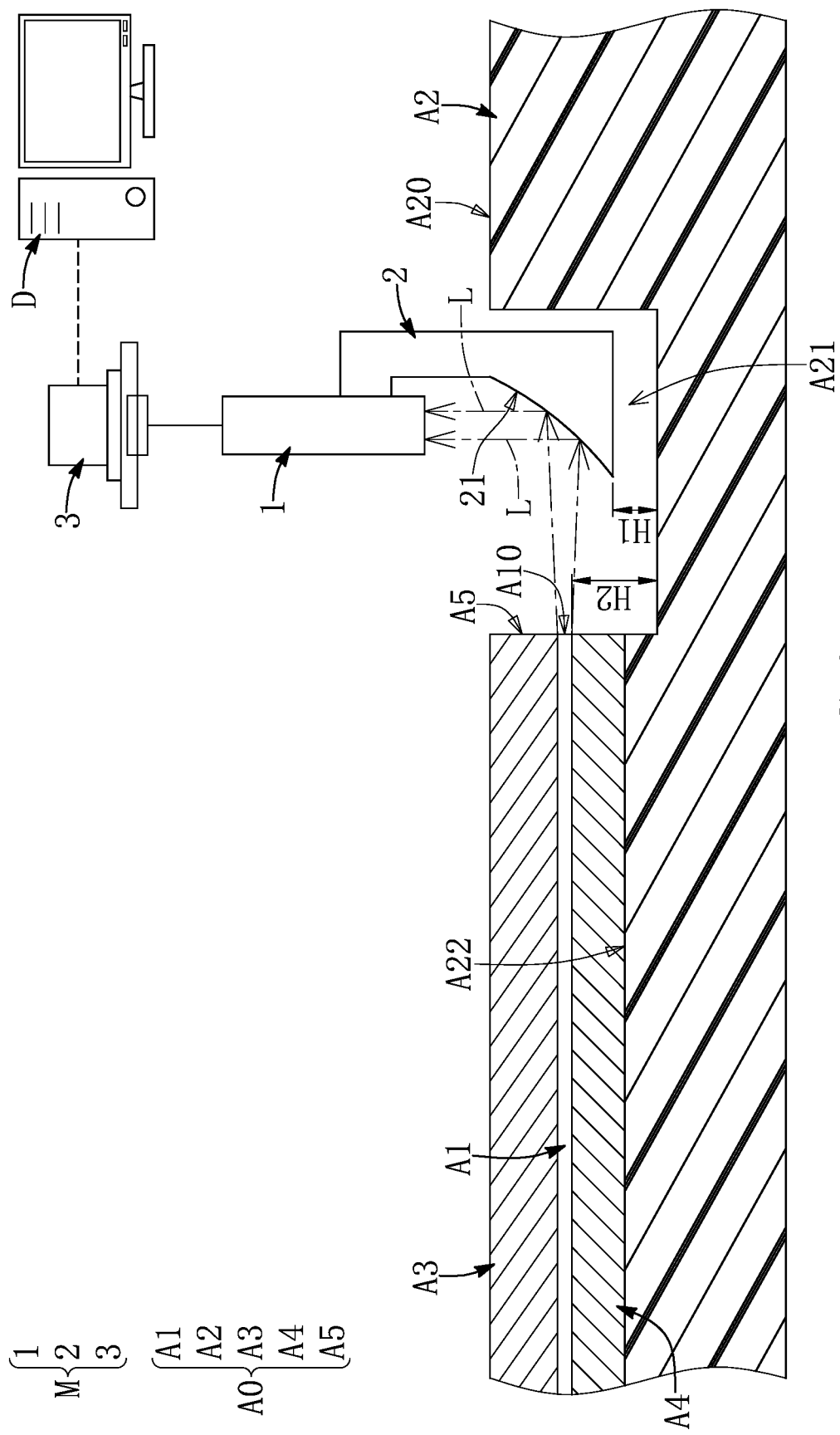
FIG. 2 is a cross-sectional view of a light guiding device according to a first embodiment of the present disclosure.

Referring to FIG. 2, a first embodiment of the present disclosure provides a light guide device M for applying to a silicon photonics structure A0, and the light guide device M includes an optical transceiver 1 and a reflective structure 2. The optical transceiver 1 is capable of emitting and/or receiving light. The reflective structure 2 is disposed on the optical transceiver 1, and the present disclosure is not limited to a coupling method between the reflective structure 2 and the optical transceiver 1. In other embodiments, the reflective structure 2 and the optical transceiver 1 can be integrally formed as a single one-piece structure. The reflective structure 2 has a reflective surface 21 facing the optical transceiver 1, and the reflective surface 21 is configured to reflect at least one light L transmitted between the optical transceiver 1 and a waveguide structure A1 of the silicon photonics structure A0.

As stated above, in addition to the waveguide structure A1, the silicon photonics structure A0 also includes a silicon substrate A2, a first cover layer A3, and a second cover layer A4. The waveguide structure A1 is disposed in the silicon substrate A2, and a slot A21 is formed on an upper surface A20 of the silicon substrate A2. For example, the silicon substrate A2 can be a silicon wafer, and the slot A21 can be a scribe line on the silicon wafer. In addition, during a process for forming the slot A21, a surface A22 with a lower height (compared to the upper surface A20) will be formed on one of two side surfaces of the slot A21, so that the surface heights of the silicon substrate A2 on two sides of the slot A21 are different. The first cover layer A3 and the second cover layer A4 cover the surface A22 of the silicon substrate A2 on a lower side of the slot A21. The waveguide structure A1 is disposed between the first cover layer A3 and the second cover layer A4 (the first cover layer A3 and the second cover layer A4 are located above and below the waveguide structure A1 respectively), the waveguide structure A1, the first cover layer A3 and the second cover layer A4 jointly constitute one side A5 adjacent to slot A21, and a port A10 of the waveguide structure A1 for receiving and emitting light is approximately aligned with the side A5.

Continuing to refer to FIG. 2, since a refractive index of the waveguide structure A1 is greater than a refractive index of the first cover layer A3 and the second cover layer A4, the light L is reflected multiple times inside the waveguide structure A1 and then exits. On other hand, the reflective structure 2 extends into the slot A21, so that the reflective surface 21 faces the waveguide structure A1, and a distance H1 between a bottom surface of the reflective structure 2 and a bottom of the slot A21 is less than a distance H2 between the waveguide structure A1 and the bottom of the slot A21. Therefore, the light L emitted from the waveguide structure A1 can be redirected by the reflective surface 21 to be emitted upwards, and received by the optical transceiver 1. In addition, it should be noted that a direction of an arrow of the light L in FIG. 2 is only for illustration, and does not mean to limit the direction of the light. For example, the light L can be emitted from the optical transceiver 1 and change a path thereof after being reflected by the reflective surface 21, so that the light L is emitted towards the waveguide structure A1 and received by the waveguide structure A1.

For example, the material of the waveguide structure A1 may include lithium niobate (LiNbO$_3$), silicon-on-insulator (SOI), or silicon compounds, etc., and the composition material of each of the first cover layer A3 and the second cover layer A4 may include silicon dioxide (SiO$_2$), but the present disclosure is not limited thereto. In other embodiments, the composition materials of the second cover layer A4 and the first cover layer A3 may also be different. The slot A21 can be formed by a semiconductor process or laser engraving, but the present disclosure is not limited thereto. In addition, an outline of the slot A21 is roughly U-shaped or V-shaped, and an average width thereof is less than 60 μm. In other words, compared with a width and a depth of the slot formed on the conventional silicon substrate are 300 μm and 100 μm, respectively, the light guide structure of the present disclosure does not need to form another light guide element in the slot A21. Therefore, the size of the slot A21 can be minimized as much as possible, so as to reserve more usable area of the silicon wafer (i.e., the silicon substrate A2).

For example, the optical transceiver 1 can be an optical fiber transceiver for converting short-distance electrical signals and long-distance optical signals. The optical transceiver 1 includes a transmitting end and a receiving end. A signal is sent from the transmitting end, and is transmitted over a long distance through an optical fiber. In addition, for example, the reflective surface 21 is a curved surface in a concave shape. Preferably, the curved surface is a spherical surface. Therefore, a curvature of the reflective surface 21 is equal to a curvature of the spherical surface. It should be noted that, since FIG. 2 is a cross-sectional view, the curvature of the reflective surface 21 of the reflective structure 2 in FIG. 2 is also equal to a curvature of a perfect circle. In the present disclosure, the curvature of the reflective surface 21 of the reflective structure 2 is not limited to the curvature of the perfect circle. In other embodiments, it may be an elliptical curvature. The curvature of the reflective surface 21 may be a curvature of an oval.

In addition, the light guide device M further includes a positioning platform 3, and the optical transceiver 1 is disposed on the positioning platform 3. For example, the positioning platform 3 is a three-dimensional mobile platform designed according to a rectangular coordinate system or a three-dimensional mobile platform designed according to a circular coordinate system or a cylindrical coordinate system, but the present disclosure is not limited to a form of the positioning platform 3. Further, the positioning platform 3 can be electrically connected to a control device D, so that a user can control the positioning platform 3 to move the optical transceiver 1 by operating the control device D. In other words, the optical transceiver 1 can move in three dimensions through the positioning platform 3.

Second Embodiment

Figure 3:
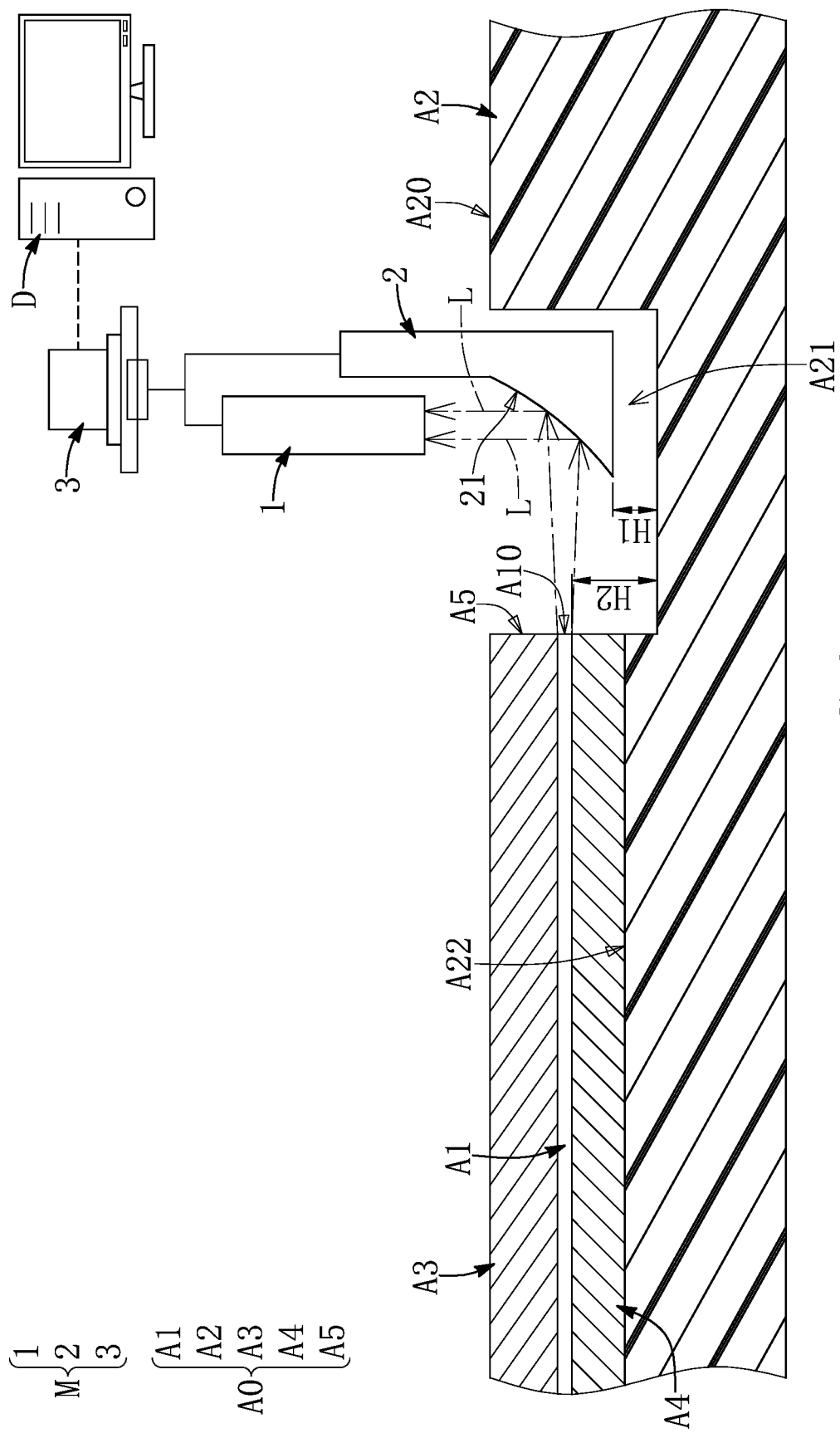
FIG. 3 is a cross-sectional view of a light guiding device according to a second embodiment of the present disclosure.

Referring to FIG. 3, compared with the light guide device M shown in FIG. 2, a light guide device M shown in FIG. 3 has a similar structure, and the similarities will not be repeated herein. Comparing FIG. 3 and FIG. 2, the light guide device M in FIG. 3 mainly includes an optical transceiver 1, a reflective structure 2, and a positioning platform 3. The reflective structure 2 has a reflective surface 21 facing the optical transceiver 1. The reflective structure 2 is used to extend into the slot A21, so that the reflective surface 21 faces the waveguide structure A1, and is used for reflecting the at least one light L transmitted between the optical transceiver 1 and a waveguide structure A1 of the silicon photonics structure A0. In the present embodiment, the structure of the reflective surface 21 and a relative position of the reflective structure 2 in the slot A21 are the same as those in the first embodiment, and will not be repeated herein. The positioning platform 3 is, for example, but not limited to, a three-dimensional mobile platform designed according to a circular coordinate system or a cylindrical coordinate system, and can connect to the optical transceiver 1 and the reflective structure 2. The positioning platform 3 can be electrically connected to a control device D, so that the user can control the positioning platform 3 to move the optical transceiver 1 and the reflective structure 2 by operating the control device D, and the optical transceiver 1 and the reflective structure 2 move in three dimensions. The user can adjust relative positions of the optical transceiver 1 and the reflective structure 2 by operating the control device D. In other words, the optical transceiver 1 and the reflective structure 2 can be corresponded in position to each other through the positioning platform 3, accurately, so that the light L can be accurately transmitted between the optical transceiver 1 and the waveguide structure A1.

Beneficial Effects of the Embodiments

In conclusion, by virtue of "the reflective structure 2 being disposed on the optical transceiver 1, or the optical transceiver 1 and the reflective structure 2 being connected through the positioning platform 3, so that the reflective surface 21 of the reflective structure 2 can reflect at least one light L transmitted between the optical transceiver 1 and a waveguide structure A1 of the silicon photonics structure A0" the light guide device M provided by the present disclosure improves the misalignment of the side light guide in the conventional technology, and eliminates the complicated process that requires additional coating, deposition and chemical etching in the slot A21 to form an independent light guide element, so as to achieve the effect of cost saving and optimization of light guide efficiency.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A light guide device applied to a silicon photonics structure, comprising:
   an optical transceiver;
   a reflective structure having a reflective surface facing the optical transceiver, wherein the reflective surface is configured to reflect at least one light transmitted between the optical transceiver and a waveguide structure of the silicon photonics structure; and
   a positioning platform configured to connect to the optical transceiver and the reflective structure, wherein the optical transceiver and the reflective structure are configured to move in three dimensions and adjust a relative position of each other through use of the positioning platform.

2. The light guide device according to claim 1, wherein the silicon photonics structure further includes a silicon substrate; wherein the waveguide structure is disposed in the silicon substrate, and a slot is formed on an upper surface of the silicon substrate; wherein the reflective structure is configured to extend into the slot, so that the reflective surface faces the waveguide structure.

3. The light guide device according to claim 2, wherein, when the reflective structure is configured to extend into the slot, a distance between a bottom surface of the reflective structure and a bottom of the slot is smaller than a distance between the waveguide structure and the bottom of the slot.

4. The light guide device according to claim 1, wherein the reflective surface is a curved surface in a concave shape.

5. The light guide device according to claim 4, wherein the curved surface is a spherical surface.

\* \* \* \* \*